Oct. 14, 1947.
T. A. DICKSON
2,428,789
SPIRAL CONVEYOR CLASSIFIER
Filed Jan. 11, 1943
3 Sheets-Sheet 1
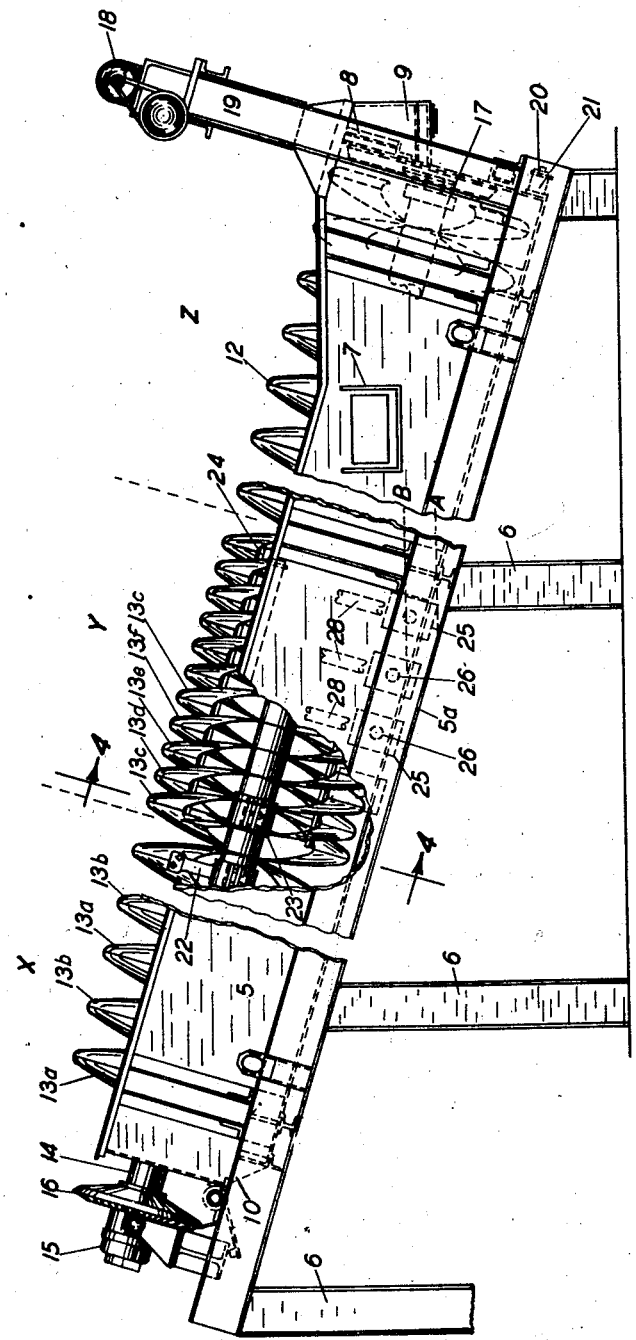
Fig.-1-
THOMAS A. DICKSON.
INVENTOR.
BY
ATTORNEY.

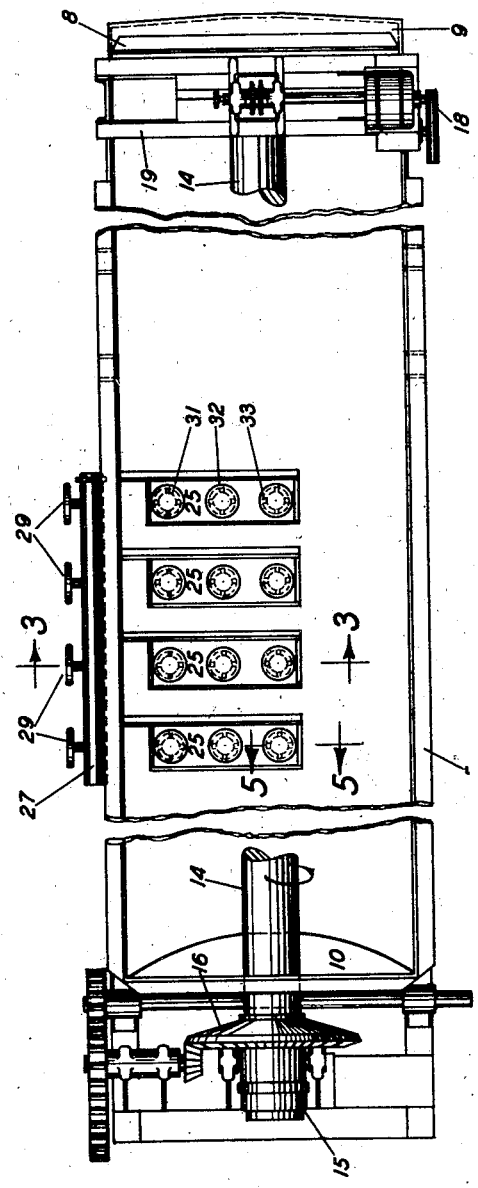

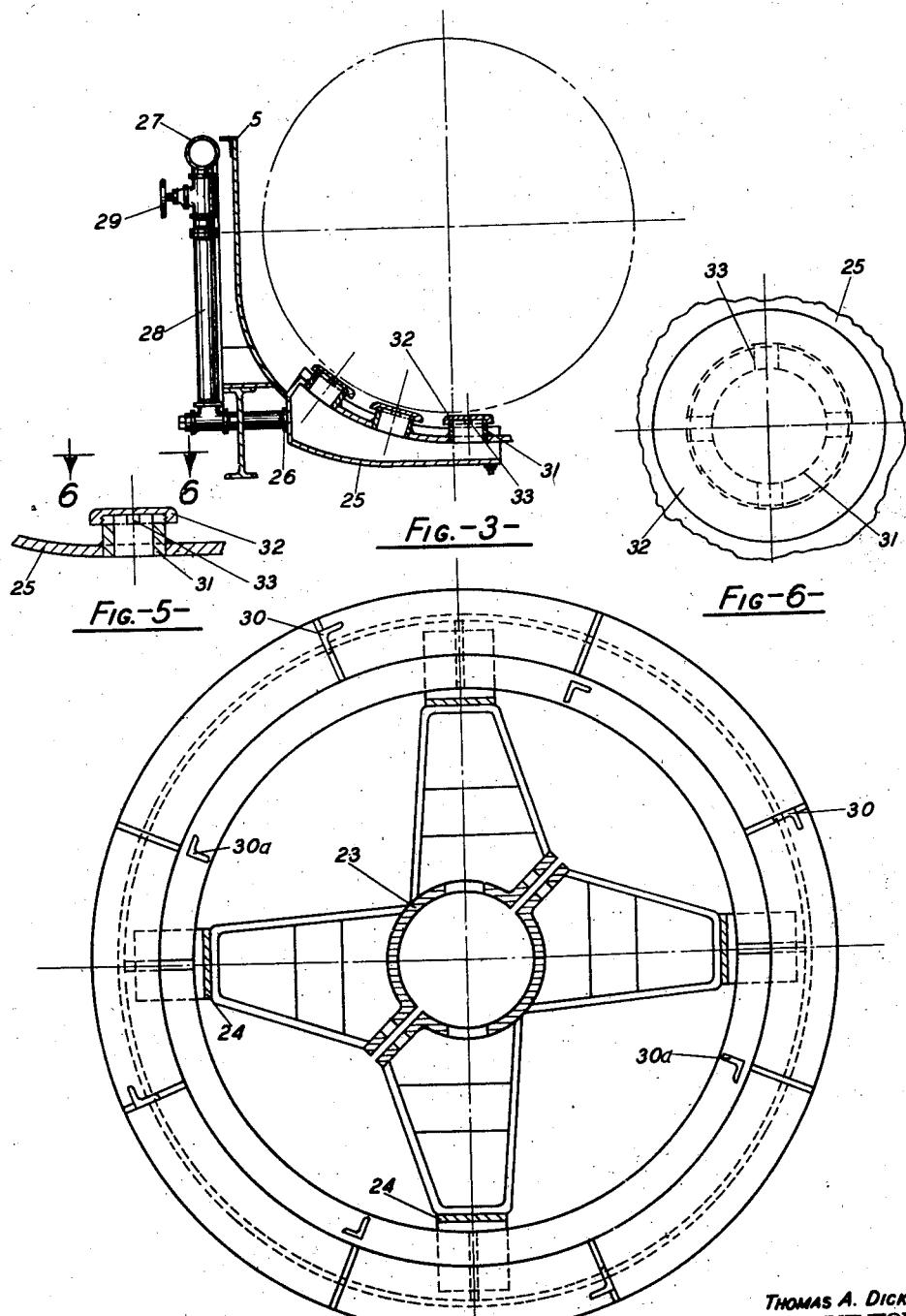

Patented Oct. 14, 1947

2,428,789

UNITED STATES PATENT OFFICE 2,428,789

SPIRAL CONVEYOR CLASSIFIER

Thomas A. Dickson, Denver, Colo., assignor to Colorado Iron Works Company, Denver, Colo., a corporation of Maine Application January 11, 1943, Serial No. 471,989

19 Claims. (Cl. 209—464)

This invention relates to classifiers and more particularly relates to classifier apparatus of the "Akins" or spiral conveyor type.

Classifiers of this type consist of a tank having an inclined bottom, a lower overflow for fines and an elevated discharge for coarse sands, with a screw or spiral conveying element disposed in the tank for moving settled sands from the pool below the overflow level to the sands discharge.

In the past, such apparatus has been employed primarily for size classifying constituents of a pulp to produce final products in graded sizes. More recently, industrial demands have created many new uses for such apparatus.

In some instances, the treatment involves the separation of soluble from insoluble particles. In other treatments, the pulp may consist of a liquid carrier vehicle containing particles of variable sizes, the mass weight of which are substantially uniform.

Consequently, a classification action which is dependent solely on differential settling rates due to differences in specific gravities does not provide a clean separation of such constituents according to size.

It is an object of the invention to provide a classifier apparatus in which settled sands are formed and moved differentially in the course of a progressive movement between the point of settling and discharge to assist separation of entrained slimes from such sands.

A further object of the invention is to provide a classifier apparatus in which settled sands are subjected to one or a plurality of washing actions in the course of a progressive movement between the point of their settling and the point of discharge to effect separation of particles of uniform mass weights but different sizes, or to dissolve soluble matter in such sands.

Other objects reside in novel details of construction and novel combinations and arrangements of parts, all of which will appear more fully in the course of the following description.

To afford a better understanding of the practice of the invention, reference will be made now to the accompanying drawings illustrating a typical embodiment of the invention. In the drawings in the several views of which like parts have been designated similarly, Figure 1 is a partially broken side elevation of classifier apparatus embodying features of the invention;

Figure 2 is a partially broken top plan view of the tank of Figure 1 with the conveyor mechanism broken away to illustrate details of the wash boxes utilized in this embodiment of the invention;

Figure 3 is a section taken along the line 3—3, Figure 2;

Figure 4 is a section taken along the line 4—4, Figure 1;

Figure 5 is a fragmentary section taken along the line 5—5, Figure 2, and drawn to an enlarged scale; and Figure 6 is a top plan view of the discharge outlet shown in Figure 5, and drawn to an enlarged scale.

Referring first to Figure 1, the apparatus comprises a tank 5, suitably supported as by beams or standards 6 with its bottom 5a in an inclined position. A feed box 7 at the lower end of the tank permits introduction of pulp into its interior and an overflow weir 8 determines the level of a pool in the lower end of the tank.

As indicated in Figure 1, the level of the pool may be relatively low as indicated by the dotted line A or relatively high as indicated by the dotted line B. The fines in liquid overflowing weir 8 discharge into a box 9 from which it may be conducted to subsequent treatment.

Settling sands fed to tank 5 through feed box 7 are moved along the inclined bottom 5a to an elevated discharge lip 10 by a spiral conveyor, designated generally by the reference numeral 12, the details of which will be described hereinafter.

The spiral conveyor comprises one or a plurality of continuous spiral members 13 mounted on a shaft 14. At its upper end the shaft is journaled in a pivotally supported bearing 15 and carries a gear 16, or other power transmission connection with a prime mover (not shown).

The lower end of the shaft 14 is journaled in a second bearing 17 which is connected with lifting mechanism 18 mounted on superstructure 19 at the end of the tank. In case of shutdowns, due to power failure or other causes, the conveyor can be raised in the tank by operation of mechanism 18 until the lower surfaces of spirals 13 are at the top of the bed of settled solids.

The shaft 14 then is rotated, and as soon as the agitation loosens the bed of settled material, the conveyor is allowed to descend until normal operating position is resumed. When it is necessary to drain the contents of tank 5, a plug 20 is removed to open an outlet 21.

The features thus far described are conventional in "Akins" classifiers. However, unlike earlier type classifiers, this embodiment employs a novel arrangement of flights comprising the spiral assembly. In this form, the upper and lower stretches of the spiral assembly have double spiral members 13a and 13b in alternate arrangement on shaft 14.

The upper stretch has been designated X in Figure 1 and the lower stretch is designated Z. Intermediate the portions X and Z the width of the blades 13 in the portion designated Y is reduced to approximately one-half the width of the blades 13 in stretches X and Z. The pitch of the blades is kept substantially uniform throughout the length of the spiral assembly.

Consequently, less material would be conveyed by the portion Y for a given rate of rotation of shaft 14, were it not for an increase in number of flights in this section. To provide the necessary surface contact to keep the bed of settled solids moving at a uniform rate and in a uniform volume along the inclined bottom 5a, the distance between flights is reduced by one-half in this section.

This has the effect of doubling the number of contacting surfaces throughout a given length of the bed of solids as well as reducing the depth of the solids bed, with the result that the reduction in surface contact area of the flights is offset by the increase in number of same. Thus flights 13c, 13d, 13e and 13f are made to occupy substantially the same space occupied by flights 13a and 13b in a given length on shaft 14.

In providing such an arrangement, a special supporting structure for the flights 13 is required. In sections X and Z these flights are supported directly from shaft 14 by arms 22, attached to the flights by bolting or in any other suitable manner. These arms are provided at regular intervals in each revolution of the spiral, and for most sizes four such supports at 90° intervals will be adequate.

Due to the crowding of the flights in the section Y, such a supporting arrangement is impractical. For this reason, spiders 23 are provided at each end of the section, and a series of bars 24, preferably disposed at 90° intervals about shaft 14 extend parallel thereto between corresponding supports on the respective spiders.

The respective flights 13c, 13d, 13e and 13f are attached to these bars by bolting, welding or the like and when thus assembled constitute an integral member in which sufficient stability and support is provided for the flights to insure continuous operation in heavy sands without deformation or breakage.

The bottom 5a of the tank, intermediate its ends is provided with a series of wash boxes 25 disposed transversely to its lengthwise axis and preferably extended upwardly along the side wall of tank 5 for a substantial distance in the direction of rotation of shaft 14.

While the location of such boxes will be varied according to the treatment problem for which the apparatus is intended, it usually will be preferred to locate them at uniformly spaced intervals along the bottom adjacent the rim of the pool determined by overflow weir 8. Each of the boxes is provided with a water inlet 26 supplied from a header 27 through conduits 28, each of which is individually controlled by a valve 29 as shown in Figure 3, and the upper surfaces of the boxes are provided with a series of discharge outlets 31.

With this understanding of the construction, the operation of the classifier will be described now. Feed is delivered through feed box 7 into tank 5 and fills the lower end of same to a level determined by the position of weir 8. Conveyor shaft 14 is caused to rotate in the direction indicated in Figure 2.

Coarse solids and heavier particles of the feed, designated generally as sands, sink, while lighter particles and slimes remain in suspension or rise to the surface under the influence of the agitation imparted by rotation of the spiral. The bed of settled solids thus formed, builds up until it extends about the flights 13 whereupon it is progressively moved out of the pool and up the inclined bottom 5a, until it is discharged across lip 10.

By the time this mass of moving solids has progressed along the bottom and reached the first washing box 25, it is well classified, but frequently contains considerable matter requiring dissolution or separation from the raked product.

Upon moving onto a wash box 25, the solids are subjected to the elevating influences of the wash water released through inlet 26 and thoroughly penetrated by the rising liquid column. This action serves to dissolve water soluble constituents of the bed, or in other treatments larger particles of lower specific gravity than the principal constituent of the raked product are caused to rise from the bed because of their greater superficial area exposed to the elevating influences of the rising liquid.

By the time the raked product has been subjected to a succession of such actions, it is essentially free from water-soluble solids or oversize foreign matter. This separation is further enhanced by the increase in number of flights in the wash box zone and reduction in the width of the flights, which reduces the depth of the moving body of solids, making it easier to obtain thorough penetration by the wash fluid.

The action of the flights 13a and 13b in moving the settled solids out of the pool serves to build up a moving body to a depth slightly in excess of the width of such blades. Consequently, when the width of the blades narrows in the zone Y, much of this material will tumble over the first flight 13e, but will be arrested by the second flight 13d. The combined moving capacity of any two of the flights from the group 13c, 13d, 13e and 13f is at least equal to the moving capacity of any one of the flights 13a or 13b and the depth of the moving body of material is reduced by approximately one-half.

Because of this, the rate of movement and volume of material moved is kept substantially uniform throughout the length of the conveyor spiral 12. But in the wash box zone, the tumbling action previously referred to combined with the reduction in depth of the moving body assists the washing action by permitting more complete and rapid penetration with the result that more particle surfaces are exposed to the ascending liquid column.

After the final washing action, the solids are permitted to form a compact body of material during the remainder of the discharging movement. Preferably, wide faced blades with greater spacing are employed throughout the remainder of the spiral stretch between the conveyor section Y and discharge lip 10. Since the primary purpose of this stretch of the conveyor is to move sands to the discharge lip, less material is required to produce the wide blade assembly, hence it is more economical to manufacture and just as efficient for its intended purpose.

Another feature that has been effective in attaining the desired action in the present apparatus is the provision of lifter blades on the spiral. While any form of blade capable of imparting the desired agitation may be so used, I have found that very good results are attained when angle studs 30 and 30a are attached to the flights with the angle formed between the sides of each member facing in the direction of rotation of the spiral.

These studs may be located at suitable intervals along the blade and in preferred practice alternate ones will be located adjacent the periphery and adjacent the inner circumferential edge of the blade, as indicated in Figure 3. When these members are moved into the solids bed they scoop into the sands, agitating and loosening the same, and thereby promote the tumbling action in the wash box zone.

While any form of angle lifters may be employed for agitating the bed, I have found it desirable to have the members 30 and 30a mounted in bridging relation to adjoining flights. In such an arrangement, the lifters function as stabilizing members in the spiral assembly, in addition to performing their usual function of agitating the solids bed.

While in most treatments, it will be desirable to employ the combination of wide and narrow blades in conjunction with one or more wash boxes, it should be noted that for some treatments, the tumbling action resulting from transferring the conveyed sands from wide flights to narrow flights will be all that is required to separate entrained foreign matter from such sands.

In other treatments, when the aforesaid arrangement is supplemented by the provision of lifter blades, the desired separation may be attained. But as the inclusion of all elements shown in the assembly of Figure 1 does not add an appreciable cost factor over these lesser arrangements, the use of the entire assembly is recommended.

Through the provision of the valves 29, a selective control of the washing action by the boxes 25 is had at all times, and whenever dilution is to be avoided, the water supply to the individual boxes can be cut off entirely. Thus, both the washing and tumbling actions are subject to close control to meet the requirements of a given treatment.

In many treatments, it will be desirable to have the wash boxes 25 disposed at a higher elevation than the pool in the tank. Thus, the sands are initially drained and then subjected to further washing. In other treatments, some or all of the boxes 25 will be submerged and drainage of the solids will not occur until after they are washed. In Figure 1, both arrangements have been indicated. If the level A is maintained all the boxes 25 are above the pool, while maintaining the level at B will submerge some of the boxes.

Different treatment conditions will require variations in the location of the boxes. Also the number of boxes will be varied according to the size of the apparatus and the amount of washing required in a given operation. The openings 31 may be of any desired form and arrangement, but preferably will comprise nipples, covered by a suitable cap element 32, and having slotted peripheral outlets 33 as illustrated in Figures 5 and 6.

In this way, solids will not enter the boxes to any appreciable degree and excessive wear on the openings and clean-out troubles are avoided. In the usual operation water will be used as the wash liquid, but it will be understood that any other solution suitable in the operation, may be so introduced into the solids bed.

Apparatus embodying the features of the present invention is intended for use wherever this type of apparatus is required. It is particularly suited for closed circuit grinding operations where it is desired to return oversize to the grinding mill by gravity. In sand washing operations where the standards permit little size variation in the raked product it is particularly effective. Also in the treatment of iron ores from open pit mining operations, the apparatus is efficient in separating siliceous matter from the iron ore where particle sizes are approximately the same, but the constituents have different specific gravities.

Features of the operation and treatment procedure have been described and claimed in my copending application Serial No. 475,265, for Hydraulic classification method.

Changes and modifications may be availed of within the spirit and scope of the invention as defined in the hereunto appended claims.

What I claim and desire to secure by Letters Patent is:

1. Classifier apparatus comprising a tank having a lower fines overflow, an upper sands discharge, and an inclined bottom, a spiral conveyor for moving settled sands along the inclined bottom to the elevated discharge, said conveyor including a lower stretch having relatively wide sands-contacting flights, and an upper stretch having relatively narrow sands-contacting flights, and liquid supply means in the path of material elevated by said conveyor for washing sands tumbling over the narrow flights after movement out of contact with the wide flights.

2. Classifier apparatus comprising a tank having a lower fines overflow, an upper sands discharge, and an inclined bottom, a rotary shaft extending through the tank substantially parallel to the inclined bottom, a spiral mounted on the shaft for conveying settled sands upwardly along the inclined bottom to the elevated discharge, said spiral including end stretches having relatively wide sands-contacting flights supported directly from the shaft, an intermediate stretch having relatively narrow sands-contacting flights, the distance between adjoining flights in the intermediate stretch being substantially less than the distance between adjoining flights of the end stretches, liquid supply means disposed at intervals along the intermediate stretch of the spiral for washing sands tumbling over said narrow flights, a plurality of supporting bars extending lengthwise of the shaft and attached to the respective flights of the intermediate section, and a spider mounted on the shaft adjacent each end of the intermediate stretch in supporting relation to said bars.

3. Classifier apparatus comprising a tank for pulp having an inclined bottom, an upper sands discharge, a lower slimes overflow determining the level of a pool in the tank, and a wash box in the bottom of the tank above the level of said pool and extending upwardly from said bottom surface a substantial distance, a spiral conveyor in the tank for moving settled sands from the pool and upwardly along the inclined bottom and over the wash box to the elevated discharge, and means for delivering a liquid under pressure through the wash box and into sands moved over the box by the spiral conveyor.

4. Classifier apparatus comprising a tank for pulp having an inclined bottom, an upper sands discharge, a lower slimes overflow determining the level of a pool in the tank, and a wash box in the bottom of the tank above the level of said pool and extending upwardly from said bottom surface a substantial distance, a spiral conveyor in the tank for moving settled sands from the pool and upwardly along the inclined bottom and over the wash box to the elevated discharge, and valve-controlled means for delivering a liquid under pressure through the wash box to wash sands moved over the box by the spiral conveyor.

5. Classifier apparatus comprising a tank for pulp having an inclined bottom, an upper sands discharge, a lower slimes overflow determining the level of a pool in the tank, and a wash box in the bottom of the tank above the level of the pool and extending upwardly from said bottom surface a substantial distance spiral conveyor in the tank for moving settled sands from the pool and upwardly along the inclined bottom to the elevated discharge, a portion of the wash box extending upwardly along the sides of the tank in the direction of rotation of the spiral and in the path of the sands elevated by the spiral, and means for delivering a liquid under pressure through the wash box to wash sands moved over the box by the spiral conveyor.

6. Classifier apparatus comprising a tank for pulp having an inclined bottom, an upper sands discharge, a lower slimes overflow determining the level of a pool in the tank, and a wash box in the bottom of the tank above the level of said pool, a spiral conveyor in the tank for moving settled sands from the pool and upwardly along the inclined bottom to the elevated discharge, said conveyor including a stretch in the pool having relatively wide sands-contacting flights, and another stretch adjacent said wash box having relatively narrow sands-contacting flights to thin the settled sands bed and impart a tumbling action to sands elevated into contact therewith as they move over said wash box, the distance between adjoining flights in the pool stretch of the spiral being substantially greater than the distance between adjoining flights in the other said stretch, and means for delivering a liquid under pressure through the wash box to wash said tumbling sands.

7. Classifier apparatus comprising a tank for pulp having an inclined bottom, an upper sands discharge, a lower slimes overflow determining the level of a pool in the tank, and a wash box in the bottom of the tank above the level of said pool, a spiral conveyor in the tank for moving settled sands from the pool and upwardly along the inclined bottom to the elevated discharge, said conveyor including a stretch in the pool having relatively wide sands-contacting flights, and another stretch adjacent said wash box having relatively narrow sands-contacting flights to thin the settled sands bed and impart a tumbling action to sands elevated into contact therewith as they move over said wash box, sands-lifting members disposed on the leading faces of said narrow flights to assist said tumbling action, and means for delivering a liquid under pressure through the wash box to wash said tumbling sands.

8. Classifier apparatus comprising a tank having a lower fines overflow, an upper sands discharge, an inclined bottom and a pool at the lower end of said inclined bottom, a spiral conveyor for moving settled sands along the inclined bottom and through the pool to the elevated discharge, said conveyor comprising a substantially submerged lower stretch having relatively wide sands-contacting flights, and an upper stretch having relatively narrow sands-contacting flights, the distance between flights in said upper stretch being reduced sufficiently to provide substantially equivalent sands-contacting surface areas in a given length of each stretch of the conveyor and the working surfaces of at least some of said narrow flights being located outside the pool, and at least one wash box mounted on the bottom of the tank adjacent said narrow flights.

9. Classifier apparatus comprising a tank having a lower fines overflow, an upper sands discharge, an inclined bottom and a pool at the lower end of said inclined bottom, a spiral conveyor for moving settled sands along the inclined bottom to the elevated discharge, said conveyor comprising two continuous spirals individually supported from a common rotary shaft 180° apart throughout a portion of its length and within the pool, and four continuous spirals jointly supported from said common shaft 90° apart throughout another portion of its length and at least partially out of said pool, with alternate spirals of the group of four forming extensions of the respective spirals of the group of two, and the distance between adjoining spirals in the group of four being reduced sufficiently to provide substantially equivalent sands-contacting surface areas in a given length of each stretch of the conveyor, and at least one wash box mounted on the bottom of the tank adjacent said group of four flights.

10. Classifier apparatus comprising a tank having a lower fines overflow, an upper sands discharge, and an inclined bottom, and a spiral conveyor for moving settled sands along the inclined bottom to the elevated discharge, said conveyor comprising a lower stretch having relatively wide sands-contacting flights, and an upper stretch having relatively narrow sands-contacting flights to thin the settled sands bed and impart a tumbling action to sands elevated into contact therewith, and a plurality of lifter blades on the leading face of the spiral portion of narrow width to assist said tumbling action, said blades comprising an angle member having the space between its sides facing in the direction of rotation of the spiral.

11. Classifier apparatus comprising a tank having a lower fines overflow, an upper sands discharge, and an inclined bottom, and a spiral conveyor for moving settled sands along the inclined bottom to the elevated discharge, said conveyor comprising a lower stretch having relatively wide sands-contacting flights, and an upper stretch having relatively narrow sands-contacting flights to thin the settled sands bed and impart a tumbling action to sands elevated into contact therewith, and a plurality of lifter blades on the leading face of the spiral portion of narrow width adjacent its periphery to assist said tumbling action, said blades comprising an angle member having the space between its sides facing in the direction of rotation of the spiral.

12. Classifier apparatus comprising a tank having a lower fines overflow, an upper sands discharge, and an inclined bottom, and a spiral conveyor for moving settled sands along the inclined bottom to the elevated discharge, said conveyor comprising a lower stretch having relatively wide sands-contacting flights, and an upper stretch having relatively narrow sands-contacting flights to thin the settled sands bed and impart a tumbling action to sands elevated into contact therewith, and a plurality of lifter blades on the leading face of the spiral portion of narrow width adjacent its inner circumferential edge to assist said tumbling action, said blades comprising an angle member having the space between its sides facing in the direction of rotation of the spiral.

13. Classifier apparatus comprising a tank for pulp having an inclined bottom, an upper sands discharge, a lower slimes overflow, and a wash box in the bottom of the tank and extending upwardly from said bottom surface a substantial distance, a spiral conveyor in the tank for moving settled sands upwardly along the inclined bottom to the elevated discharge, a portion of the wash box extending upwardly along the sides of the tank in the direction of rotation of the spiral and in the path of material elevated by the spiral, and means for delivering a liquid under pressure through the wash box to wash sands moved over the box by the spiral conveyor.

14. Classifier apparatus comprising a tank having a lower fines overflow, an upper sands discharge, and an inclined bottom, a rotary shaft extending through the tank substantially parallel to the inclined bottom, a spiral mounted on the shaft for conveying settled sands upwardly along the inclined bottom to the elevated discharge, said spiral including a lower stretch having relatively wide sands-contacting flights supported directly from the shaft and an upper stretch having relatively narrow sands-contacting flights, the distance between adjoining flights in the upper stretch being substantially less than the distance between adjoining flights of the lower stretch, a plurality of supporting bars extending lengthwise of the shaft and attached to the respective flights of said upper stretch to form a unitary structure, and a spider mounted on the shaft adjacent each end of said upper stretch in supporting relation to said unitary structure.

15. Classifier apparatus comprising a tank for pulp having an inclined bottom, an upper sands discharge, a lower slimes overflow determining the level of a pool in the tank, and a wash box in the bottom of the tank below the level of said pool, said wash box having upwardly extending outlets, inclusive of lateral ports, for the discharge of solution into the tank, cap members covering the upper ends of said outlets, a spiral conveyor in the tank for moving settled sands from the pool and upwardly along the inclined bottom to the elevated discharge, and means for delivering a liquid under pressure through the wash box into sands moved over said covered outlets by the spiral conveyor.

16. Classifier apparatus comprising a tank for pulp having an inclined bottom, an upper sands discharge, a lower slimes overflow determining the level of a pool in the tank, and a wash box in the bottom of the tank below the level of said pool, a spiral conveyor in the tank for moving settled sands from the pool and upwardly along the inclined bottom to the elevated discharge, said conveyor including a stretch in the pool having relatively wide sands-contacting flights, and another stretch adjacent said wash box having sands-contacting flights of approximately one-half the width of said relatively wide flights to thin the settled sands bed and impart a tumbling action to sands elevated into contact therewith as they move over said wash box, the distance between adjoining flights of the pool stretch of the conveyor being approximately double the distance between flights in said other stretch and means for delivering a liquid under pressure through the wash box to wash said tumbling sands.

17. Classifier apparatus comprising a tank for pulp having an inclined bottom, a sands discharge at its upper end, a slimes overflow at its lower end determining the level of a pool in the tank, and a wash box in the bottom of the tank intermediate said discharge and overflow, a spiral conveyor in the tank for moving settled sands from the pool and upwardly along the inclined bottom to the upper discharge, said wash box having an upstanding outlet member arranged to extend a substantial distance through to the bed of sands and terminating in proximity to the spiral but slightly spaced therefrom and in the path of sands moved by the spiral, and means for delivering a wash solution through the wash box and into said loosened sands.

18. Classifier apparatus comprising a tank having a lower fines overflow, an upper sand discharge, and an inclined bottom, a spiral conveyor for moving settled sands along the inclined bottom to the elevated discharge, said conveyor including a lower stretch having relatively wide sands-contacting flights, and an upper stretch having relatively narrow-sands-contacting flights, the distance between adjoining flights in the upper stretch being substantially less than the distance between adjoining flights of the lower stretch, and liquid supply means disposed at intervals along the stretch of the spiral having the narrow flights for washing sand tumbling over said narrow flights.

19. Classifier apparatus comprising a tank having a lower fines overflow, an upper sands discharge, and an inclined bottom, a spiral conveyor for moving settled sands along the inclined bottom to the elevated discharge, said conveyor including end stretches having relatively wide sands contacting flights and an intermediate stretch having relatively narrow sands contacting flights, the distance between adjoining flights in the intermediate stretch being substantially less than the distance between adjoining flights of the end stretches, and liquid supply means disposed at intervals along the intermediate stretch of the spiral for washing sands tumbling over said narrow flights.

THOMAS A. DICKSON.

REFERENCES CITED

The following references are of record in the file of this patent:

UNITED STATES PATENTS

| Number | Name | Date |
| --- | --- | --- |
| 1,412,010 | Akins | Apr. 4, 1922 |
| 2,189,418 | Finney | Feb. 6, 1940 |
| 2,276,539 | Finney | Mar. 17, 1942 |
| 849,379 | Dorr | Apr. 9, 1907 |
| 1,660,589 | Aulmann | Feb. 28, 1928 |
| 1,984,362 | Dickson | Dec. 18, 1934 |
| 1,695,021 | Puryear | Dec. 11, 1928 |
| 2,353,152 | Erck | Jul. 11, 1944 |

FOREIGN PATENTS

| Number | Country | Date |
| --- | --- | --- |
| 18,091 | Great Britain | 1894 |